United States Patent
Guo et al.

(10) Patent No.: US 10,721,943 B2
(45) Date of Patent: Jul. 28, 2020

(54) HAND-PRESS COFFEE MACHINE AND METHOD FOR BREWING COFFEE

(71) Applicant: Good Cheer LLC, Wilmington, DE (US)

(72) Inventors: Jiangang Guo, Guangdong (CN); Yongchun Zeng, Guangdong (CN)

(73) Assignee: Good Cheer LLC, Wilmington, DE (US)

( * ) Notice: Subject to any disclaimer, the term of this patent is extended or adjusted under 35 U.S.C. 154(b) by 254 days.

(21) Appl. No.: 15/427,959

(22) Filed: Feb. 8, 2017

(65) Prior Publication Data
US 2018/0220838 A1 Aug. 9, 2018

(51) Int. Cl.
*A23F 5/24* (2006.01)
*A47J 31/46* (2006.01)
*A47J 31/38* (2006.01)

(52) U.S. Cl.
CPC ............ *A23F 5/24* (2013.01); *A47J 31/38* (2013.01)

(58) Field of Classification Search
CPC ......... A23F 5/262; A23F 5/24; A47J 31/0663; A47J 31/38; A47J 31/46; A47J 31/407; A47J 31/3623; A47J 31/005; A47J 31/18; A47J 31/24; A47J 31/44; A47J 31/4403; A47J 31/4489

USPC .............. 426/433; 99/295, 302 R, 297, 279, 99/289 R, 302 P, 287, 289 P
See application file for complete search history.

(56) References Cited

U.S. PATENT DOCUMENTS

| | | | | |
|---|---|---|---|---|
| 3,754,463 | A | * 8/1973 | Vernooy | A47J 31/057 99/295 |
| 5,299,595 | A | * 4/1994 | Ribeiro | A47J 31/46 137/107 |
| 9,883,765 | B2 | * 2/2018 | Samso Besora | A47J 31/38 |
| 2003/0041739 | A1 | * 3/2003 | Cai | A47J 27/2105 99/287 |
| 2011/0030732 | A1 | * 2/2011 | Boussemart | A47J 31/60 134/18 |
| 2015/0125576 | A1 | * 5/2015 | Dogan | B65D 85/8043 426/115 |
| 2016/0227958 | A1 | * 8/2016 | Zhao | A47J 31/38 |
| 2016/0278570 | A1 | * 9/2016 | Shi | A47J 31/3628 |

* cited by examiner

*Primary Examiner* — Tu B Hoang
*Assistant Examiner* — Tiffany T Tran (57) ABSTRACT

A hand-press coffee machine comprising a water tank, a hand pump which is disposed at the upper end of the water tank, and a brewing component which is connected to the lower end of the water tank; a water hole is disposed at the point where the water tank and the brewing component are connected; the hand pump is used to pump the water in the water tank into the brewing component through the water hole; a unidirectional valve, which is disposed in the water hole between the water tank and the brewing component, is set to merely allow the water in the water tank to flow into the brewing component; the present invention can effectively protect the coffee powder from being pre-soaked.

14 Claims, 5 Drawing Sheets

HAND-PRESS COFFEE MACHINE AND METHOD FOR BREWING COFFEE

TECHNICAL FIELD OF THE INVENTION

The present invention relates to the technical field of coffee machines, and more particularly, to a hand-press coffee machine and a process for brewing coffee.

BACKGROUND OF THE INVENTION

Today, people have an insatiable desire for coffee. There are various coffee machines sold in the market. In the prior art, a water-pump pressure coffee machine can produce a stronger coffee with a taste. A small-sized manual pressure coffee pot disclosed in the Chinese patent CN103479224B comprises a filter bowl, a piston-type pressure pump, and a coffee box component. A central spacer divides the chamber of the filter bowl into an upper space for storing the hot water, and a lower space for accommodating the coffee box component. The manual piston-type pressure pump is disposed in the upper space, and the coffee powder is stored in the coffee powder box. Meanwhile, the coffee powder box is tightly pressed in the lower space via a sleeve piece, and the filter bowl is disposed at the upper end of the pot body. When making coffee, the user can feed coffee powder or a coffee capsule into the coffee powder box, then fix the coffee powder box to the lower end of the filter bowl. Subsequently, filter is mounted on the pot body, and boiling water is mounted into the filter bowl. The boiled water can be pumped into the coffee powder box in the lower portion of the filter bowl when the pot cover is closed and the piston is pressed. After being filtered, the concentrated coffee can be accessed by the user. In such a structure, the filter bowl is interconnected to the coffee box component, meaning that the water added into the filter bowl can directly enter into the coffee box component to pre-soak the coffee powder when the pressure pump has not been initiated. Consequently, the coffee taste can be seriously affected due to the pre-soaking in a low-pressure state. Once the pressure pump is initiated, the upward movement of the pressure pump can make a part of the coffee in the coffee box component to reflow, which can be sucked into the filter bowl to mix with the water therein, which can pollute the water in the filter bowl. Due to the above shortcomings, the traditional pressure pump coffee machine fails to make a good-tasting coffee. Under such circumstances, the user must first feed the coffee powder into the coffee box component, then add water into the water tank and immediately initiate the pressure pump so as to prevent the coffee powder from being pre-soaked. Thus, in order to achieve a good coffee taste, the user must strictly follow a fixed process to brew coffee, which is inconvenient.

In conclusion, the shortcomings of the traditional coffee machine are urgent problems that need to be solved for those skilled in this field.

SUMMARY OF THE INVENTION

The purpose of the present invention is to solve the shortcomings in the prior art and provide a hand-press coffee machine, which can protect the coffee powder from being pre-soaked and avoiding the coffee from reflowing; the present invention also provides a method for brewing coffee, which greatly improves the coffee taste and is convenient for the users to operate.

To achieve the above purpose, the present invention adopts the following technical solution:

A hand-press coffee machine comprising a water tank, a hand pump which is disposed at the upper end of the water tank, and a brewing component which is connected to the lower end of the water tank. A water hole is disposed at the place where the water tank and the brewing component are connected. The hand pump is used to pump the water in the water tank into the brewing component through the water hole. A unidirectional valve, which is disposed in the water hole between the water tank and the brewing component, is configured to allow the water in the water tank to flow into the brewing component. The present invention can effectively protect the coffee powder from being pre-soaked, and prevent the coffee from reflowing, ensuring the coffee brewed by the present invention is of excellent quality.

In another aspect of the present invention, the unidirectional valve comprises a valve core and a spring. The valve core is disposed in the water hole between the water tank and the brewing component. The spring is used to propel the valve core to block the water hole between the water tank and the brewing component. The unidirectional valve of the present invention has a simple structure, effectively preventing the water in the water tank from freely flowing into the brewing component.

In another aspect of the present invention, the unidirectional valve comprises a valve ball and a valve plug. The valve ball, which is made from elastic material, is disposed in the water hole between the water tank and the brewing component. The valve plug is used to tightly press the valve ball, enabling the valve ball to block the water hole between the water tank and the brewing component. This simple-structured unidirectional valve can effectively prevent the water in the water tank from freely flowing into the brewing component.

In another aspect of the present invention, the hand pump comprises a pump body, a plunger and a joint valve. The plunger, which is disposed in the inner chamber of the pump body, can extend and retract in a reciprocating manner. The joint valve is connected to the bottom of the pump body. A water inlet hole and a water outlet hole are disposed on the joint valve. The water inlet hole is connected to the water tank and the inner chamber of the pump body. The water outlet hole is connected to the inner chamber of the pump body and the unidirectional valve. A unidirectional inlet valve is disposed at the place where the water inlet hole is located, and a unidirectional outlet valve is disposed at the place where the water outlet hole is located. The hand pump having such a simple structure can effectively pump the water in the water tank into the brewing component so as to realize an efficient and labor-saving operation.

In another aspect of the present invention, a mounting portion is disposed on the bottom surface in the water tank. The pump body is mounted in the mounting portion, and the lower end surface of the pump body is sleeved by a sealing circle. The sealing circle is tightly pressed between the mounting portion and the pump body, which greatly improves the sealing performance between the water tank and the hand pump, and increases the pressure of the water pumped into the brewing component.

In another aspect of the present invention, the joint valve and the pump body are detachably connected through a continuous thread structure, which greatly improves the sealing performance between the joint valve and the pump body, and increases the pressure of the water pumped into the brewing component.

In another aspect of the present invention, the upper end portion of the joint valve is sleeved by a sealing ring, and the joint valve is sleeved by the pump body. The sealing ring is tightly pressed between the pump body and the joint valve, which further improves the sealing performance between the joint valve and the pump body, and increases the pressure of the water pumped into the brewing component.

In another aspect of the present invention, a sealing cover is disposed on the pump body. When the hand pump is mounted on the water tank, the sealing cover engages with the upper end opening of the water tank, enabling the upper end opening to be effectively sealed. Through sealing the water tank via the sealing cover, the pressure of the water pumped into the brewing component can be greatly increased, which extracts more coffee and produces a better taste.

In another aspect of the present invention, an inlet valve is disposed on the sealing cover. The interior and the exterior of the water tank are interconnected through the inlet valve. When the hand pump moves upward to introduce the water in the water tank, the external air can enter into the water tank through the inlet valve, reducing the difficulty of introducing water due to the imbalance of the air pressure. Additionally, when the hand pump moves downward to pump the water into the brewing component, the pressure of the pumped water can be increased through sealing the water tank.

In another aspect of the present invention, the brewing component comprises a funnel which is disposed at the bottom of the water tank. A brewing chamber is formed by the inner space connecting the funnel and the water tank. The upper end of the brewing chamber is connected to the water hole. The high-pressure water mixes with the coffer powder in the brewing chamber, and flows from the funnel after being extracted, enabling the coffee to be conveniently accessed by the user.

In another aspect of the present invention, an upper bayonet, which is disposed downward in the brewing chamber, is disposed at the lower end of the water hole. A lower bayonet, which is disposed upward in the brewing chamber, is disposed at the lower end of the funnel. When brewing coffee by a coffee capsule, the user can place the coffee capsule into the funnel closer to the brewing chamber; the funnel can be mounted to the bottom of the water tank, enabling the coffee capsule to be automatically pierced by the upper bayonet and the lower bayonet.

In another aspect of the present invention, the brewing component comprises a shower head, a screen case and a funnel. The shower head is mounted to the bottom of the water tank, and the water inlet end of the shower head is interconnected to the water hole. The screen case is mounted underneath the shower head, and the water inlet end of the screen case is interconnected to the water outlet end of the shower head. The funnel is mounted underneath the screen case, and the coffee powder can be stored in the screen case. The shower head supplies water to the screen case, enabling the water to be sprayed into the screen case through the shower head.

In another aspect of the present invention, a liquid inlet hole is disposed at the upper end of the shower head. The liquid inlet hole, which is disposed in the middle of the shower head, is interconnected to the water hole. A liquid outlet hole, which comprises a plurality of holes arranged side by side, is disposed at the lower end of the shower head. The liquid outlet hole is interconnected to the screen case. The liquid inlet hole introduces water, and the liquid outlet hole evacuates water, effectively increasing the showering area in the screen case. Consequently, the upper end surface of the screen case can be wholly covered in the showering area, thereby increasing the contact area of the coffee powder and the water. Thus, a uniform mixing can be achieved.

The present invention also provides a method for brewing coffee, which can be applied to the above hand-press coffee machine, which includes adding water into the water tank, and mounting the hand pump to the upper end of the water tank; a coffee capsule is then placed into the brewing component, and fixing the brewing component to the lower end of the water tank, thereby enabling the coffee capsule to be pierced. As an alternative step in the referenced method, a coffee capsule is placed into the brewing component, and fixing the brewing component to the lower end of the water tank, thereby enabling the coffee capsule to be pierced; afterwards, adding water into the water tank, and mounting the hand pump to the upper end of the water tank.

As an alternative step in the referenced method, water is added into the water tank, and a coffee capsule is placed into the brewing component; afterwards, fixing the brewing component to the lower end of the water tank, thereby enabling the coffee capsule to be pierced; afterwards, mounting the hand pump to the upper end of the water tank;

Alternatively, water is added into the water tank, and placing a coffee capsule into the brewing component; afterwards, mounting the hand pump to the upper end of the water tank, and fixing the brewing component to the lower end of the water tank, thereby enabling the coffee capsule to be pierced.

Alternatively, a coffee capsule is placed into the brewing component, and water is added into the water tank; afterwards, fixing the brewing component to the lower end of the water tank, thereby enabling the coffee capsule to be pierced; afterwards, mounting the hand pump to the upper end of the water tank;

Finally, the hand pump is operated by pumping the water in the water tank into the brewing component, thereby completing the brewing process.

The present invention has the following advantages:

According to the brewing process of the present invention, the user can freely operate the hand-press coffee machine of the present invention to brew coffee without restriction. It's unnecessary for the user to intentionally follow a fixed process, realizing an unrestricted and convenient operation.

The hand-press coffee machine of the present invention adopts a unidirectional valve which is disposed between the water tank and the brewing component, effectively preventing water in the water tank from freely flowing into the brewing component. Water can be pumped into the brewing component from the water tank only when the pressure is high enough. Furthermore, the unidirectional valve can completely prevent the coffee in the brewing component from reflowing into the water tank. The coffee machine of the present invention not only can protect the coffee from being pre-soaked, but can prevent water in the water tank from being mixed with the coffee, ensuring the brewed coffee has a quality taste. Additionally, the user can operate the coffee machine of the present invention to brew coffee according to the brewing process of the present invention. Whether water is added into the water tank or the coffee capsule/coffee powder is added into the brewing component, the water in the water tank is prevented from entering into the brewing component due to the existence of the unidirectional valve. During the brewing process, the coffee in the brewing component can be prevented from reflowing into the water tank, enabling the user to freely operate the coffee machine. Thus, a desired brewing effect and a convenient operation can be achieved.

BRIEF DESCRIPTION OF THE DRAWINGS

To clearly expound the present invention or technical solution, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

10, Water Tank; 20, Hand Pump; 30, Brewing Component; 40, Unidirectional Valve; 11, Sealing Cover; 12, Inlet Valve; 13, Water Hole; 14, Sealing Element; 21, Pump Body; 22, Plunger; 23, Joint valve; 24, Water Inlet Hole;

25, Water Outlet Hole; 26, Unidirectional Inlet Valve; 27, Unidirectional Outlet Valve; 28, Sealing Circle; 29, Sealing Ring; 31, Brewing Chamber; 32, Funnel;

33, Upper Bayonet; 34, Lower Bayonet; 35, Shower Head; 36, Screen Case; 37, Liquid Inlet Hole; 38, Liquid Outlet Hole; 41, Valve Core; 42, Spring;

43, Valve Ball; 44, Valve Plug.

DETAILED DESCRIPTION OF THE INVENTION

Drawings and detailed embodiments are combined hereinafter to elaborate the technical principles of the present invention.

Figure 1:
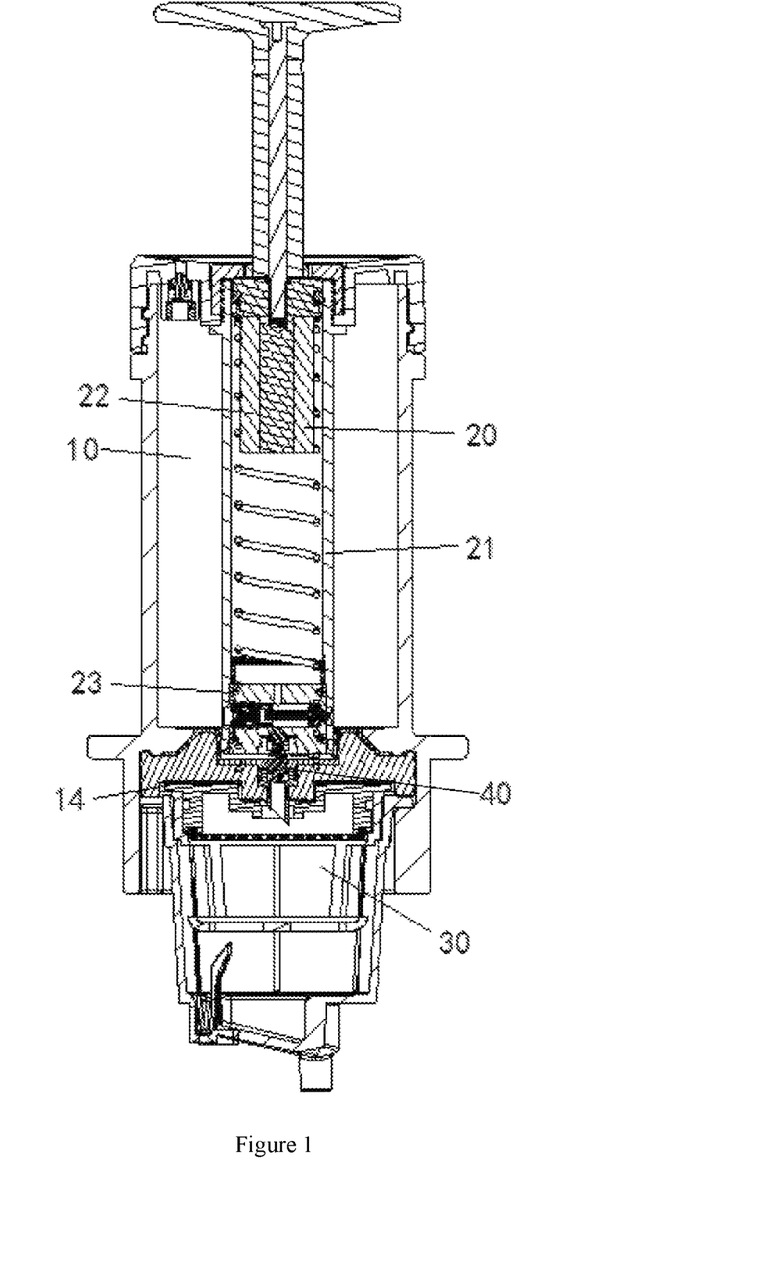
FIG. 1 is a structure diagram of the present invention.

As shown in FIG. 1, the hand-press coffee machine comprises a water tank 10, a hand pump 20 which is disposed at the upper end of the water tank 10, and a brewing component 30 which is connected to the lower end of the water tank 10. A water hole 13 is disposed at the point where the water tank 10 and the brewing component 30 are connected. The hand pump 20 is used to pump the water in the water tank 10 into the brewing component 30 through the water hole 13. A unidirectional valve 40, which is disposed in the water hole 13 between the water tank 10 and the brewing component 30, is set to merely allow the water in the water tank 10 to flow into the brewing component 30. The hand-press coffee machine of the present invention adopts a unidirectional valve 40, which is disposed between the water tank 10 and the brewing component 30, effectively preventing water in the water tank 10 from freely flowing into the brewing component 30. Only when the pressure is high enough, e.g. under the working condition of the hand pump 20, water can be pumped into the brewing component 30 from the water tank 10. Furthermore, the unidirectional valve 40 can completely prevent the coffee in the brewing component 30 from reflowing into the water tank 10. Consequently, the coffee machine of the present invention not only can protect the coffee from being pre-soaked, but prevent the water in the water tank 10 from being mixed with the coffee, ensuring that the coffee has an excellent quality.

Figure 2:
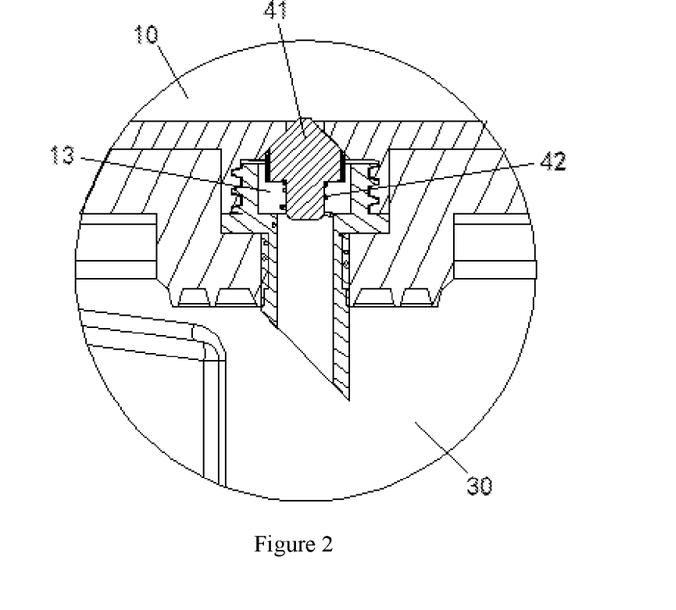
FIG. 2 is a first structure diagram of the unidirectional valve of the present invention.
Figure 3:
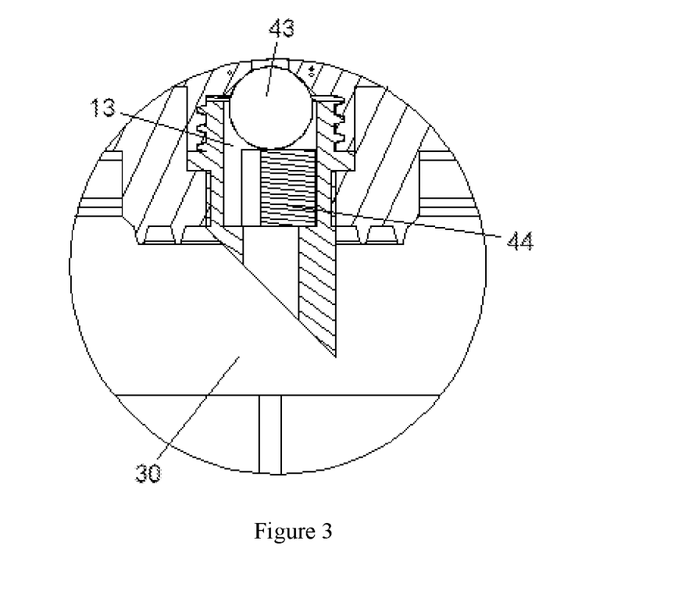
FIG. 3 is a second structure diagram of the unidirectional valve of the present invention.

Specifically, as shown in FIG. 2, the unidirectional valve comprises a valve core 41 and a spring 42. The valve core 41 is disposed in the water hole 13 between the water tank 10 and the brewing component 30. The spring 42 is used to propel the valve core 41 to block the water hole 13 between the water tank 10 and the brewing component 30. The unidirectional valve 40 of the present invention has a simple structure, effectively preventing the water in the water tank 10 from freely flowing into the brewing component 30. In a normal state, the valve core 41 is raised by the spring 42 to block the channel connecting the water tank 10 and the brewing component 30. Meanwhile, the spring 42 has a certain elasticity, preventing the valve core 41 from moving under a certain water pressure. When adding water into the water tank, the valve core 41 can keep blocking the channel. When the hand pump 20 moves downward, the water can be lifted and pumped into the channel by the hand pump 20. A higher water pressure can overcome the elasticity of the spring 42 and jack up the valve core 41. Thus, the blocked channel is open, enabling the water in the water tank 10 to smoothly enter into the brewing component 30. When the hand pump 20 moves upward, the valve core 41 bears no water pressure, returning to the original position and blocking the channel again. Thus, the coffee in the brewing component 30 can be separated from the water tank 10, and is prevented from entering into the water tank 10. Or, as shown in FIG. 3, the unidirectional valve comprises a valve ball 43 and a valve plug 44. The valve ball 43, which is made from elastic material, is disposed in the water hole 13 between the water tank 10 and the brewing component 30. The valve plug 44 is used to tightly press the valve ball 43, enabling the valve ball 43 to block the water hole 13 between the water tank 10 and the brewing component 30. The simple-structured unidirectional valve 40 can effectively prevent the water in the water tank 10 from freely flowing into the brewing component 30. In a normal state, the valve ball 43 blocks the channel connecting the water tank 10 and the brewing component 30 due to the valve plug 44 disposed against the valve ball 43. The valve ball is made from elastic material having a certain stretch/flexibility, preventing the valve ball 43 from moving under a certain water pressure. When adding water into the water tank, the valve ball 43 can keep blocking the channel. When the hand pump 20 moves downward, the water can be lifted and pumped into the channel through the hand pump 20. A higher water pressure can overcome the elasticity of the valve ball 43, leading to the deformation of the valve ball 43. Thus, the blocked channel is open, enabling the water in the water tank 10 to smoothly enter into the brewing component 30. When the hand pump 20 moves upward, the valve ball 43 bears no water pressure, automatically recovering its original shape and blocking the channel again. Thus, the coffee in the brewing component 30 can be separated from the water tank 10, and prevented from entering into the water tank 10.

Figure 4:
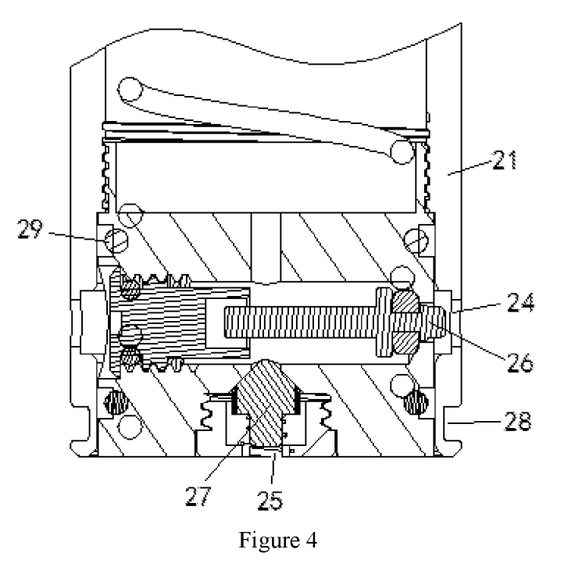
FIG. 4 is a structure diagram of the joint valve of the hand pump of the present invention.
Figure 5:
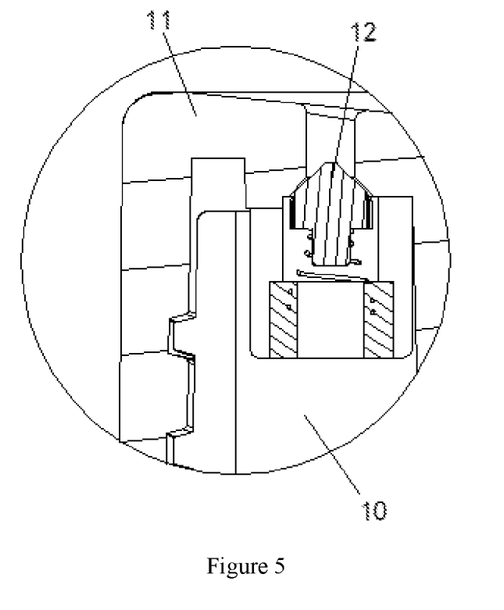
FIG. 5 is a structure diagram of the inlet valve of the hand pump of the present invention.

Specifically, as shown in FIG. 1, the hand pump 20 comprises a pump body 21, a plunger 22 and a joint valve 23. The plunger 22, which is disposed in the inner chamber of the pump body 21, can extend and retract in a reciprocating manner. The joint valve 23 is connected to the bottom of the pump body 21. As shown in FIG. 4, a water inlet hole 24 and a water outlet hole 25 are disposed on the joint valve 23. The water inlet hole 24 is connected to the water tank 10 and the inner chamber of the pump body 21. The water outlet hole 25 is connected to the inner chamber of the pump body 21 and the unidirectional valve 40. A unidirectional inlet valve 26 is disposed at the point where the water inlet hole 24 is located, and a unidirectional outlet valve 27 is disposed at the point where the water outlet hole 25 is located. When the plunger 22 moves downward in the pump body 21, the unidirectional inlet valve is closed, and the unidirectional outlet valve 27 is open. The water in the inner chamber of the pump body 21 is pumped out from the water outlet hole 25 and enters into the brewing component 30 through the unidirectional valve 40. When the plunger 22 moves upward in the pump body 22, the unidirectional inlet valve 26 is open, and the unidirectional outlet valve 27 is closed. The water in the water tank 10 enters into the inner chamber of the pump body 21 through the water inlet hole 24. The plunger 22 reciprocates in such a way, enabling the water in the water tank 10 to be continuously pumped into the brewing component 30, so as to brew the coffee. To improve the pressure of pumping water, a sealing cover 11 is disposed on the pump body 21. When the hand pump 20 is mounted on the water tank 10, the sealing cover 11 engages with the upper end opening of the water tank 10, enabling the upper end opening to be effectively sealed. Through sealing the water tank 10 via the sealing cover 11, the pressure of the water pumped into the brewing component 30 can be greatly increased, and the extracting effect of the coffee can be sufficiently improved, providing the coffee a desired taste. As shown in FIG. 5, an inlet valve 12 is disposed on the sealing cover 11. The interior and the exterior of the water tank 10 are interconnected through the inlet valve 12. When the hand pump 20 moves upward to introduce the water in the water tank 10, the external air can enter into the water tank 10 through the inlet valve 12, reducing the difficulty of introducing water due to the imbalance of the air pressure. Additionally, when the hand pump 20 moves downward to pump the water into the brewing component 30, the pressure of the pumped water can be increased through sealing the water tank. For a convenient operation, a pressing or lifting handle is disposed on the plunger 22 of the hand pump 20, through which the plunger 22 can be conveniently operated so as to save labor. Further, a mounting portion is disposed on the bottom surface in the water tank 10. The pump body 21 is mounted in the mounting portion, and the lower end surface of the pump body 21 is sleeved by a sealing circle 28. The sealing circle 28 is tightly pressed between the mounting portion and the pump body 21, which greatly improves the sealing performance between the water tank 10 and the hand pump 20, and increases the pressure of the water pumped into the brewing component 30. The joint valve 23 and the pump body 21 are detachably connected through a continuous thread structure, which improves the sealing performance between the joint valve 23 and the pump body 21, and increases the pressure of the water pumped into the brewing component 30. The upper end portion of the joint valve 23 is sleeved by a sealing ring 29, and the joint valve 23 is sleeved by the pump body 21. The sealing ring 29 is tightly pressed between the pump body 21 and the joint valve 23, which further improves the sealing performance between the joint valve 23 and the pump body 21, and increases the pressure of the water pumped into the brewing component 30. A sealing element 14, which is disposed at the bottom of the water tank 10, is located between the water tank 10 and the brewing component 30. Thus, the sealing performance between the water tank 10 and the brewing component can be greatly improved, and the pressure of the water pumped into the brewing component 30 can be effectively increased.

Figure 6:
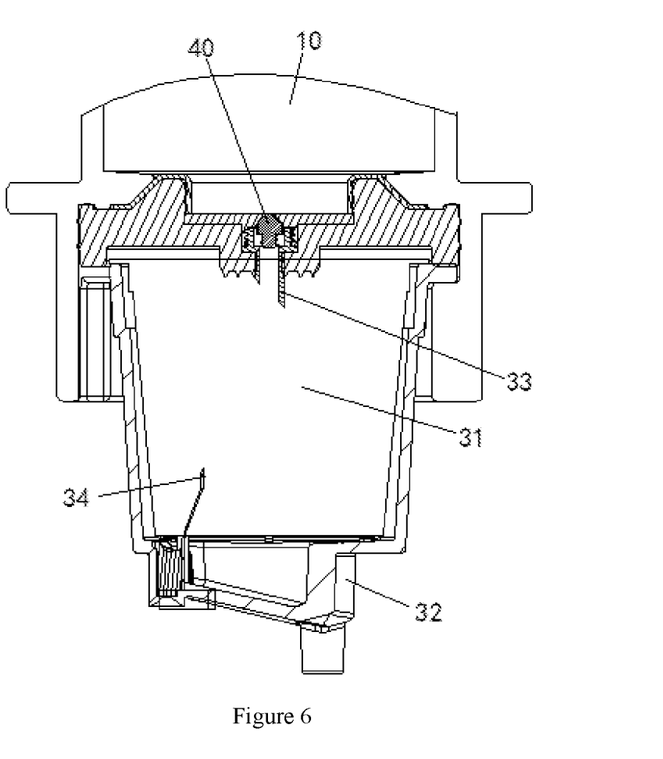
FIG. 6 is a first structure diagram of the brewing component of the present invention.

As shown in FIG. 6, the brewing component 30 comprises a funnel 32 which is disposed at the bottom of the water tank 10. A brewing chamber 31 is formed by the inner space connecting the funnel 32 and the water tank 10. The upper end of the brewing chamber 31 is connected to the water hole 13. The high-pressure water mixes with the coffer powder in the brewing chamber 31, and flows from the funnel 32 after being extracted, enabling the coffee to be conveniently accessed by the user. The user can either feed coffee powder into the brewing chamber 31 or place a coffee capsule into the brewing chamber 31 to brew coffee. When using a coffee capsule to brew coffee, an upper bayonet 33 disposed downward in the brewing chamber 31 can be disposed at the lower end of the water hole 13, and a lower bayonet 34 disposed upward in the brewing chamber 31 can be disposed at the lower end of the funnel 32. At this moment, the user can place the coffee capsule into the funnel 32 and make it towards the position of the brewing chamber 31, then mount the funnel 32 to the bottom of the water tank 10. Thus, the upper end of the coffee capsule can be pierced by the upper bayonet 33, and the lower end of the coffee capsule can be pierced by the lower bayonet 34, enabling the pumped water to flow through the interior of the capsule from top to bottom so as to complete the brewing process. After being brewed, the coffee flows out from the funnel 32, which can be conveniently accessed by the user.

Figure 7:
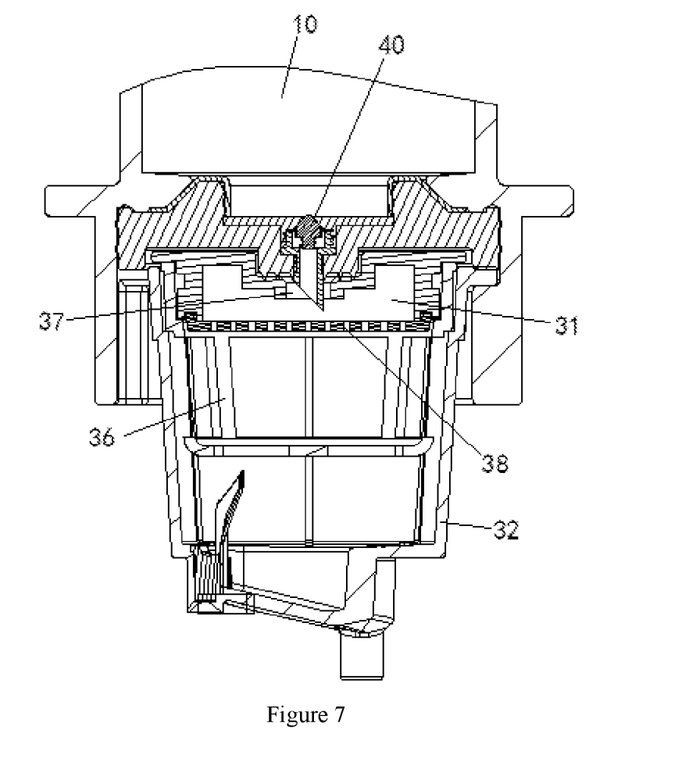
FIG. 7 is a second structure diagram of the brewing component of the present invention.

As shown in FIG. 7, the brewing component 30 comprises a shower head 35, a screen case 36 and a funnel 32. The shower head 35 is mounted to the bottom of the water tank 10, and the water inlet end of the shower head 35 is interconnected to the water hole 13. The screen case 36 is mounted underneath the shower head 35, and the water inlet end of the screen case 36 is interconnected to the water outlet end of the shower head 35. The funnel 32 is mounted underneath the screen case 36. A liquid inlet hole 37 is disposed at the upper end of the shower head 35. The liquid inlet hole 37, which is disposed in the middle of the shower head 35, is interconnected to the water hole 13. A liquid outlet hole 38, which comprises a plurality of holes arranged side by side, is disposed at the lower end of the shower head 35. The liquid outlet hole 38 is interconnected to the screen case 36, and the coffee powder can be fed into the screen case 36. When the water pumped by the hand pump 20 enters into the interior of the shower head 35 from the liquid inlet hole 37 in the middle of the shower head, it can be sprayed into the screen case 36 from the liquid outlet hole 38 composed of a plurality of spraying holes in the lower portion of the shower head 35. The shower head 35 supplies water to the screen case 36, enabling the water to enter into the screen case 36 from multiple directions so as to increase the showering area. Consequently, the upper end surface of the screen case can be wholly covered in the showering area, thereby increasing the contact area of the power powder and the water. Thus, a uniform mixing can be achieved. After being brewed, the coffee can flow out through the funnel 32, which is convenient for the user to access.

FIG. 7 also illustrates a method for brewing coffee, including the steps of:

Adding water into the water tank 10, and mounting the hand pump 20 to the upper end of the water tank 10; afterwards, placing a coffee capsule into the brewing component 30, and fixing the brewing component 30 to the lower end of the water tank 10, thereby enabling the coffee capsule to be pierced;

Or, placing a coffee capsule into the brewing component 30, and fixing the brewing component 30 to the lower end of the water tank 10, thereby enabling the coffee capsule to be pierced; afterwards, adding water into the water tank 10, and mounting the hand pump 20 to the upper end of the water tank 10;

Or, adding water into the water tank 10, and placing a coffee capsule into the brewing component 30; afterwards, fixing the brewing component 30 to the lower end of the water tank 10, thereby enabling the coffee capsule to be pierced; afterwards, mounting the hand pump 20 to the upper end of the water tank 10;

Or, adding water into the water tank 10, and placing a coffee capsule into the brewing component 30; afterwards, mounting the hand pump 20 to the upper end of the water tank 10, and fixing the brewing component 30 to the lower end of the water tank 10, thereby enabling the coffee capsule to be pierced;

Or, placing a coffee capsule into the brewing component 30, and adding water into the water tank 10; afterwards, fixing the brewing component 30 to the lower end of the water tank 10, thereby enabling the coffee capsule to be pierced; afterwards, mounting the hand pump 20 to the upper end of the water tank 10;

Operating the hand pump 20, and pumping the water in the water tank into the brewing component 30, thereby completing the brewing process.

Adding water into the water tank 10, and mounting the hand pump 20 to the upper end of the water tank 10; afterwards, placing a coffee capsule into the brewing component 30, and fixing the brewing component 30 to the lower end of the water tank 10, thereby enabling the coffee capsule to be pierced; Or, placing a coffee capsule into the brewing component 30, and fixing the brewing component 30 to the lower end of the water tank 10, thereby enabling the coffee capsule to be pierced; afterwards, adding water into the water tank 10, and mounting the hand pump 20 to the upper end of the water tank 10; finally, the hand pump 20 is operated by pumping the water in the water tank into the brewing component 30, thereby completing the brewing process.

The user can operate the coffee machine of the present invention to brew coffee according to the brewing process of the present invention. Regardless whether water is added into the tank 10, or the coffee capsule/coffee powder is added into the brewing component 30 is carried out first, the water in the water tank 10 can be prevented from entering into the brewing component 30, and the coffee in the brewing component 30 can be prevented from reflowing into the water tank 10 due to the existence of the unidirectional valve 40, enabling the user to freely operate the coffee machine. A desired brewing effect can be achieved according to such a free and unrestricted operation, realizing a convenient brewing process. After the coffee is brewed, the user can directly access the coffee from the bottom of the funnel 32.

The previous descriptions are of preferred examples for implementing the invention, and the scope of the invention should not necessarily be limited by this description. The scope of the present invention is defined by the claims.

The invention claimed is:

1. A hand-press coffee machine, comprising:
   a water tank,
   a hand pump which is disposed at the upper end of the water tank, and
   a brewing component which is connected to the lower end of the water tank;
   a water hole is disposed at the point where the water tank and the brewing component are connected,
   an upper bayonet disposed at the lower end of the water hole;
   wherein the hand pump is used to pump the water in the water tank into the brewing component through the water hole, wherein a unidirectional valve, which is disposed in the water hole between the water tank and the brewing component, is configured to allow the water in the water tank to flow into the brewing component;
   wherein the unidirectional valve further comprising a valve core, and a spring, wherein the diameter of an upper end of the valve core larger than the diameter of the upper bayonet, wherein the diameter of a lower end of the valve core is smaller than the diameter of the upper bayonet, wherein the lower end of the valve core is disposed inside the spring, wherein the spring is disposed between the upper end of the valve core and the top of the upper bayonet, wherein the elasticity of the spring raises the valve core to block a channel connecting the water tank and the brewing component.

2. The hand-press coffee machine of claim 1, wherein the hand pump comprises: a pump body, a plunger, and a joint valve, wherein the plunger, which is disposed in the inner chamber of the pump body, can extend and retract in a reciprocating manner, wherein the joint valve is connected to the bottom of the pump body, wherein a water inlet hole and a water outlet hole are disposed on the joint valve, wherein the water inlet hole is connected to the water tank and the inner chamber of the pump body, wherein the water outlet hole is connected to the inner chamber of the pump body and the unidirectional valve, wherein a unidirectional inlet valve is disposed at the place where the water inlet hole is located, and a unidirectional outlet valve is disposed at the place where the water outlet hole is located.

3. The hand-press coffee machine of claim 2, wherein a mounting portion is disposed on the bottom surface in the water tank, wherein the pump body is mounted in the mounting portion, and the lower end surface of the pump body is sleeved by a sealing circle, wherein the sealing circle is tightly pressed between the mounting portion and the pump body.

4. The hand-press coffee machine of claim 2, wherein the joint valve and the pump body are detachably connected through a continuous thread structure.

5. The hand-press coffee machine of claim 4, wherein the upper end portion of the joint valve is sleeved by a sealing ring, and the joint valve is sleeved by the pump body, wherein the sealing ring is tightly pressed between the pump body and the joint valve.

6. The hand-press coffee machine of claim 2, wherein a sealing cover is disposed on the pump body, wherein when the hand pump is mounted on the water tank, the sealing cover engages with the upper end opening of the water tank, enabling the upper end opening to be effectively sealed.

7. The hand-press coffee machine of claim 6, wherein an inlet valve is disposed on the sealing cover, wherein the interior and the exterior of the water tank are interconnected through the inlet valve.

8. The hand-press coffee machine of claim 1, wherein the brewing component comprises a funnel which is disposed at the bottom of the water tank, wherein a brewing chamber is formed by the inner space connecting the funnel and the water tank, wherein the upper end of the brewing chamber is connected to the water hole.

9. The hand-press coffee machine of claim 1, wherein the brewing component comprises a funnel which is disposed at the bottom of the water tank, wherein a brewing chamber is formed by the inner space connecting the funnel and the water tank, wherein the upper end of the brewing chamber is connected to the water hole.

10. The hand-press coffee machine of claim 8, wherein a lower bayonet, which is disposed upward in the brewing chamber, is disposed at the lower end of the funnel.

11. The hand-press coffee machine of claim 1, wherein the brewing component comprises:
   a shower head,
   a screen case, and
   a funnel, wherein the shower head is mounted to the bottom of the water tank, and the water inlet end of the shower head is interconnected to the water hole, wherein the screen case is mounted underneath the shower head, and the water inlet end of the screen case is interconnected to the water outlet end of the shower head, wherein the funnel is mounted underneath the screen case.

12. The hand-press coffee machine of claim 1, wherein the brewing component comprises:
   a shower head,
   a screen case, and
   a funnel, wherein the shower head is mounted to the bottom of the water tank, and the water inlet end of the shower head is interconnected to the water hole, wherein the screen case is mounted underneath the shower head, and the water inlet end of the screen case is interconnected to the water outlet end of the shower head, wherein the funnel is mounted underneath the screen case.

13. The hand-press coffee machine of claim 10, wherein a liquid inlet hole is disposed at the upper end of the shower head, wherein the liquid inlet hole, which is disposed in the middle of the shower head, is interconnected to the water hole, wherein a liquid outlet hole, which comprises a plurality of holes arranged side by side, is disposed at the lower end of the shower head, wherein the liquid outlet hole is interconnected to the screen case.

14. A hand-press coffee machine, comprising:
   a water tank,
   a hand pump which is disposed at the upper end of the water tank, and
   a brewing component which is connected to the lower end of the water tank;
   a water hole is disposed at the point where the water tank and the brewing component are connected,
   an upper bayonet disposed at the lower end of the water hole, wherein the center of the water hole aligns with the center of the bayonet;
   wherein the hand pump is used to pump the water in the water tank into the brewing component through the water hole, wherein a unidirectional valve, which is disposed in the water hole between the water tank and the brewing component, is configured to allow the water in the water tank to flow into the brewing component;
   wherein the unidirectional valve further comprising a valve ball, and a valve plug, wherein the valve ball, which is made from elastic material, is disposed in the water hole between the water tank and the brewing component, wherein the valve plug is disposed on top of the upper bayonet and the center of the valve plug does not align with the center of the bayonet leaving a portion of the bayonet open, wherein the center of the valve ball aligns with the center of the bayonet, wherein the valve plug tightly press the valve ball against a channel connecting the water tank and the brewing component, enabling the valve ball to block the water hole between the water tank and the brewing component.

* * * * *